(12) United States Patent
Fagundes

(10) Patent No.: US 11,874,971 B1
(45) Date of Patent: Jan. 16, 2024

(54) MOBILE APP WITH KEYPAD FOR GPS PIN DROPPING

(71) Applicant: Dominc Fagundes, Tulare, CA (US)

(72) Inventor: Dominc Fagundes, Tulare, CA (US)

( * ) Notice: Subject to any disclaimer, the term of this patent is extended or adjusted under 35 U.S.C. 154(b) by 0 days.

(21) Appl. No.: 17/867,991

(22) Filed: Jul. 19, 2022

Related U.S. Application Data

(60) Provisional application No. 63/223,222, filed on Jul. 19, 2021.

(51) Int. Cl.
*G06F 3/02* (2006.01)
*G06F 16/587* (2019.01)

(52) U.S. Cl.
CPC .......... *G06F 3/0202* (2013.01); *G06F 16/587* (2019.01)

(58) Field of Classification Search
CPC ........ G06F 3/02; G06F 3/0202; G06F 3/0219; G06F 3/0221; G06F 3/0227; G06F 3/023; G06F 3/0231; G06F 3/0236; G06F 3/0238; G06F 16/587; H03M 11/00; H03M 11/02
See application file for complete search history.

(56) References Cited

U.S. PATENT DOCUMENTS

| | | | |
|---|---|---|---|
| 11,262,910 B2* | 3/2022 | Napier | G06F 3/016 |
| 2014/0200961 A1* | 7/2014 | Folks | G06Q 50/26 |
| | | | 705/7.34 |

FOREIGN PATENT DOCUMENTS

GB  2483929 A  *  3/2012  ...........  G09B 29/007

* cited by examiner

*Primary Examiner* — Franklin D Balseca
(74) *Attorney, Agent, or Firm* — Sandy Lipkin

(57) ABSTRACT

A specialized keypad and associated mobile application in communication therewith that allows for pre-installed markers that are color-coded to be used to drop GPS pins on a map to identify the presence of those pre-installed markers on a geographical map. The specialized keypad can be attached to a pair of handle bars or on a steering of a vehicle, said vehicle then going into specific geographic locations for the markers identified by the pre-installed markers, such that specific items that correspond to the color coded markers, such that when the colored pin is dropped on the map created by the app, there is no need to take the extra time to identify what the GPS pins are identifying, since the pre-installed application has already color-coded the items to the pins on both the interface with the application on the mobile device as well as the keypad associated therewith.

6 Claims, 3 Drawing Sheets

MOBILE APP WITH KEYPAD FOR GPS PIN DROPPING

REFERENCE TO PRIOR APPLICATION

This application claims priority of the provisional patent application 63/223,222, filed Jul. 19, 2021 entitled MOBIILE APP/KEYPAD FOR GPS PIN DROPPING by Dominic Fagundes.

BACKGROUND OF THE INVENTION

Field of the Invention

The field of this invention relates generally to the field of geolocation and more particularly toward a device and method that allows for quickly and easily marking geographic locations using a mobile app coupled with a specialized keypad.

Description of the Prior Art

In the field of rodent control in agriculture, it is the case that a geographical area needs to be surveyed for locations where rodents and pests are suspected to be present. Currently, how this is accomplished is that a surveyor drives his vehicle to the property to be surveyed, parks his vehicle, pulls out a mobile device, places a pin drop, and then names the pin drop for which reason it is being placed.

It is the object of the instant invention to provide an improvement over prior art methods to provide a less labor intensive and efficient method to accomplish the mapping of the geolocation for rodents and pests.

The device and method of the instant invention could also be used for any application where mapping of a geographic location needs to be carried out.

SUMMARY OF THE INVENTION

The basic embodiment of the present invention teaches a method of marking a precise spot in a specific geographic location comprising: providing a mobile device; providing a specialized keypad with one or more coded input buttons; installing an application on said mobile device that is in communication with said keypad wherein said application is programmed to correlate said one or more coded input buttons to a specific physical item that may be found at any given specific geographic location; physically traveling throughout said specific geographic location with said mobile device and said specialized keypad; locating and identifying on said specific geographic location one or more of said specific physical items in order to create a digital marker with a GPS pin; pressing an appropriately correlated coded input button that correlates to said specific physical item in said specific geographic location, said pressing of said correlated coded input button which then sends communication to said mobile application wherein said mobile application then records in said application that said specific physical item has been located at said specific geographic location and then dropping a coded GPS pin that correlates to said coded input button and said specific physical item; and creating a printout map that identifies precisely where in said specific geographic location where said specific physical item is located such that said GPS pin associated therewith is coded to match said coded input button.

The above embodiment can be further modified by defining that said keypad is mountable on a vehicle The above embodiment can be further modified by defining that said coded input buttons are coded by color.

The above embodiment can be further modified by defining that said coded input buttons are coded by letters.

The above embodiment can be further modified by defining that said coded input buttons are coded by numbers.

The above embodiment can be further modified by defining that said coded input buttons are coded by geometric shapes.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF A PREFERRED EMBODIMENT

Figure 1:
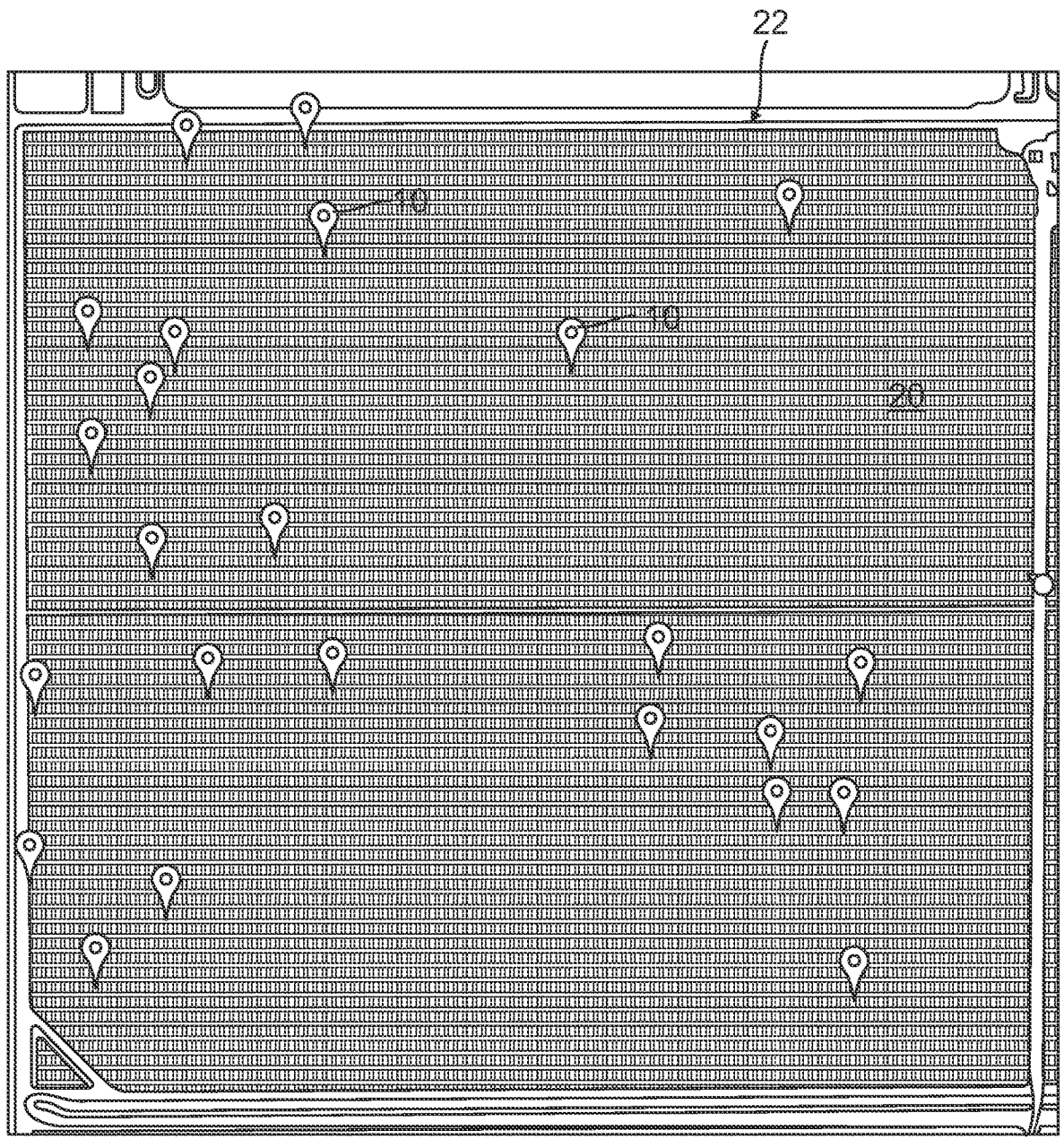
FIG. 1 is an exemplary image from the mobile application portion of the instant invention showing GPS pins that have been dropped to identify the location.

Turning to the drawings, the preferred embodiment is illustrated and described by reference characters that denote similar elements throughout the several views of the instant invention.

Figure 3:
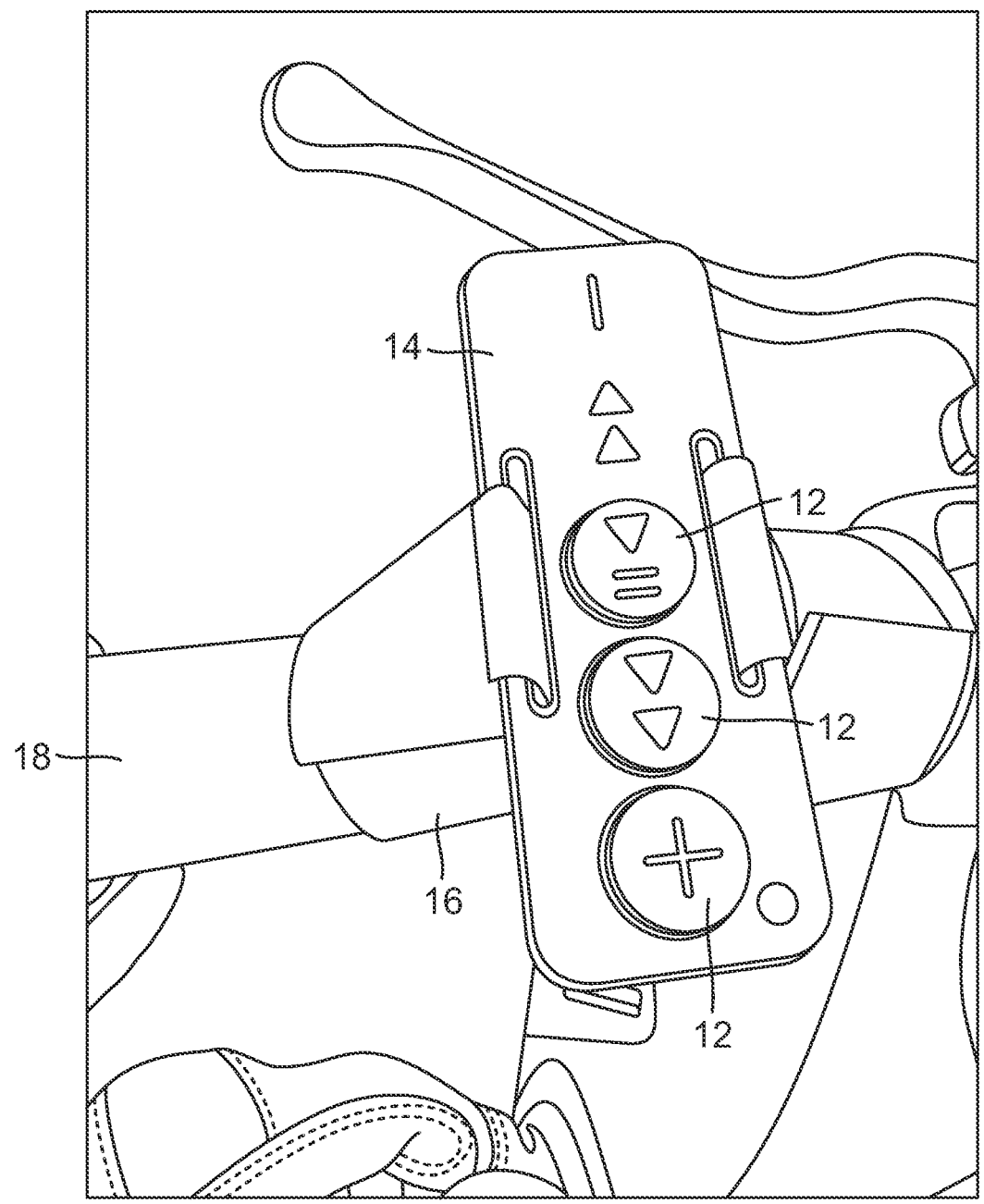
FIG. 3 is a top view of the specialized keypad of the instant invention as it can be used with the mobile application that marks geographical locations with GPS pins.

The preferred embodiment of the instant invention provides for a streamlined way to be able to drop a color coded or OPS pins 10 with the click of a button 12 found on the specialized keypad device 14 (See FIG. 3). Alternatively, the pins 10 and the buttons 12 on the keypad device 14 could be matched by some other device, such as numbers, letters, symbols and the like.

The instant invention utilizes a mobile app that is in communication with an external color-coded BLUETOOTH® keypad 14 which can be mounted to a handle bar 16 or steering wheel of a vehicle 18 that is surveying the geographical location 20. The app and key pad 14 allow the user to be able to click a color-coded button 12 associated with a specific identifier to drop the same color-coded pin 10 simultaneously in the location 20 of the mobile device on the go.

Figure 2:
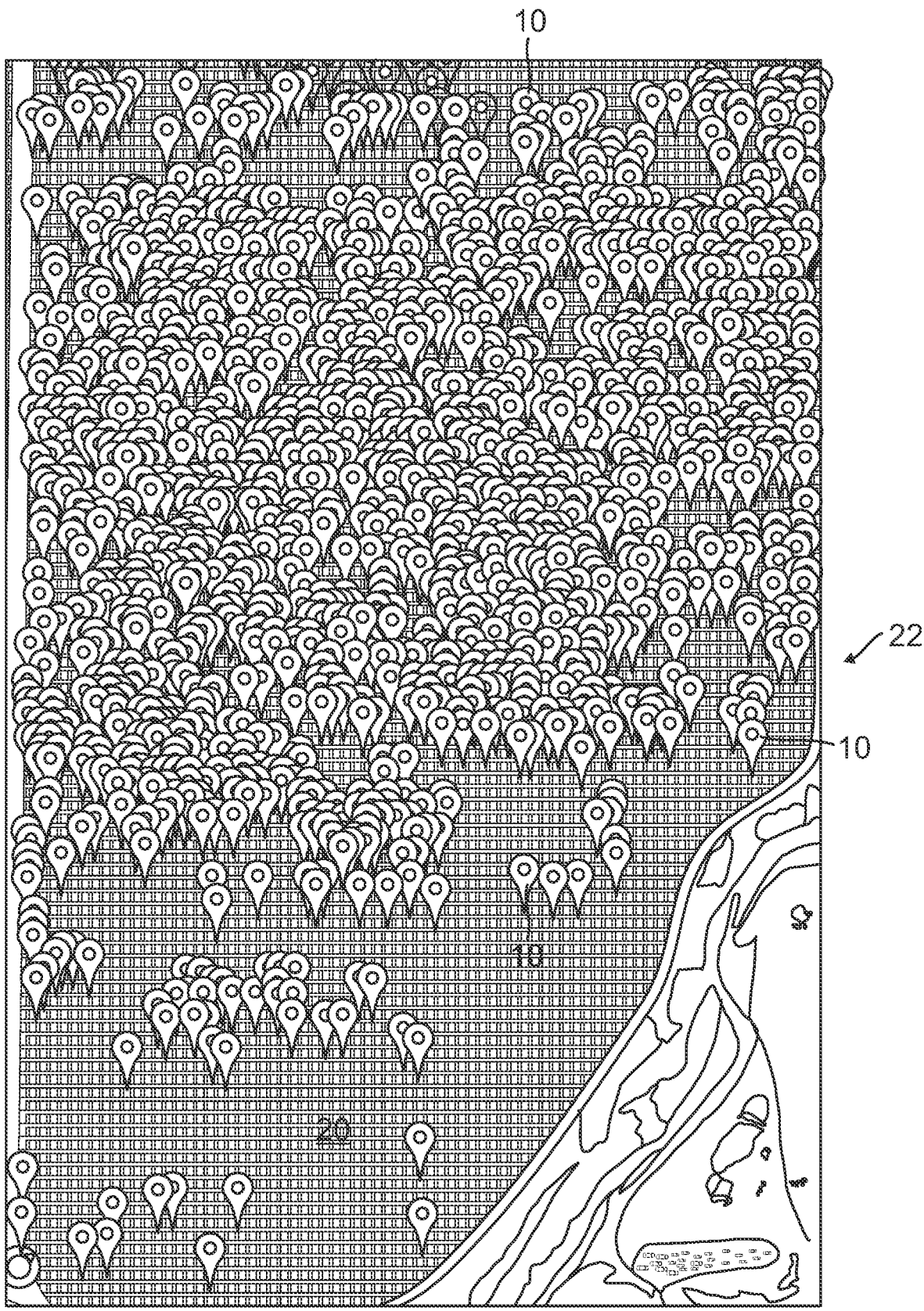
FIG. 2 is another exemplary image similar to FIG. 1 but with more locations being identified with GPS pins.

The mobile device onto which the app is installed 14 will be able to store files which will contain the maps 22 being produced showing the multicolored pins 10 in a satellite view. (See FIGS. 1 and 2). This method with its accompanying specialized keypad device 14 reduces the time it takes to stop a vehicle, pull out a mobile device, place a pin drop, and name the pin drop to identify the reason the GPS pin 10 is being dropped.

The system is customizable for the specific desired use, such that each color will represent something different based on the application of the user. In the preferred embodiment, green pins represent gophers and orange pins represent squirrels. The colors used can be changeable in the settings.

The invention illustratively disclosed herein suitably may be practiced in the absence of any element which is not specifically disclosed herein.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A method of marking a precise spot in a specific geographic location comprising:
   providing a mobile device;
   providing a specialized keypad with one or more coded input buttons;
   installing an application on said mobile device that is in communication with said keypad wherein said application is programmed to correlate each coded input button of said one or more coded input buttons to a specific physical item of a plurality of specific physical items that may be found at any given location of said specific geographic location;
   physically traveling throughout said specific geographic location with said mobile device and said specialized keypad;
   locating and identifying on said specific geographic location one or more of said specific physical items in order to create a digital marker with a GPS pin;
   pressing an appropriately correlated coded input button of said one or more coded input buttons that correlates to a first specific physical item of said located and identified specific physical items in said specific geographic location, said pressing of said correlated coded input button which then sends communication to said mobile application wherein said mobile application then records in said application that said first specific physical item has been located at said specific geographic location and then dropping a coded GPS pin that correlates to said pressed coded input button and said first specific physical item; and
   creating a printout map that identifies precisely where in said specific geographic location where said first specific physical item is located such that said GPS pin associated therewith is coded to match said pressed coded input button.

2. The method of claim 1 wherein said keypad is mountable on a vehicle.

3. The method as defined in claim 1 wherein said coded input buttons are coded by color.

4. The method as defined in claim 1 wherein said coded input buttons are coded by letters.

5. The method as defined in claim 1 wherein said coded input buttons are coded by numbers.

6. The method as defined in claim 1 wherein said coded input buttons are coded by geometric shapes.

* * * * *